US006246591B1

(12) United States Patent
Ikeda et al.

(10) Patent No.: US 6,246,591 B1
(45) **Date of Patent: *Jun. 12, 2001**

(54) POWER CABLE ARRANGEMENT IN ELECTRONIC APPARATUS

(75) Inventors: Akihiro Ikeda, Nagoya; Keiichi Matsunaga, Seto, both of (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,066

(22) Filed: Mar. 5, 1998

(30) Foreign Application Priority Data

Mar. 7, 1997 (JP) ..................... 9-052726

(51) Int. Cl.[7] ..................... H02B 1/20

(52) U.S. Cl. ..................... 361/827; 361/826; 174/72 A

(58) Field of Search ..................... 361/826, 827, 361/784, 803, 816; 174/72 A, 72 R; 439/62; 336/65, 107

(56) References Cited

U.S. PATENT DOCUMENTS

| | | | | |
|---|---|---|---|---|
| 5,380,222 | * | 1/1995 | Kobayashi | 439/590 |
| 5,469,335 | * | 11/1995 | Kluth et al. | 361/800 |
| 5,534,665 | * | 7/1996 | Long | 174/72 A |
| 5,676,552 | * | 10/1997 | Fukuda et al. | 439/34 |

* cited by examiner

*Primary Examiner*—Jayprakash N. Gandhi
(74) *Attorney, Agent, or Firm*—Oliff & Berridge, PLC

(57) ABSTRACT

A structure is provided for arranging power cables in an electronic apparatus. The cable arrangement structure includes a first control board, a transformer mounted on the first control board, a second control board spaced from the first control board, a connector mounted on the second control board in facing relation to the transformer, and a plurality of power cables extending from the connector, the plurality of power cables including at least one power supply cable and at least one power return cable. The plurality of power cables are bundled together at an intermediate portion.

33 Claims, 2 Drawing Sheets

POWER CABLE ARRANGEMENT IN ELECTRONIC APPARATUS

BACKGROUND OF THE INVENTION

1. Field of the Invention

The present invention relates to a power cable arrangement structure in an electronic apparatus such as a facsimile machine, printer, copying machine or image scanner.

2. Description of the Related Art

A facsimile machine is an electronic apparatus used for transmitting and receiving image data to and from a remote facsimile machine through a telephone line. For this purpose, the facsimile machine incorporates a modem and a network control unit (NCU) provided with a transformer. The modem and the NCU may be disposed on a power circuit board. Further, the facsimile machine also incorporates a printhead mounted on a signal processing circuit board which receives and processes the image data from the modem or an image reading unit.

The power circuit board of the facsimile machine is connected to a commercial power outlet of e.g. AC 100V and to the signal processing circuit board. The power supply circuit on the power circuit board converts the AC power voltage to a DC power voltage of 6–24V for use on the signal processing circuit board. The electrical connection between the power circuit board and the signal processing circuit board is established by a suitable number of power cables which include at least one power supply cable for supplying the DC power and at least one power return cable for passage of return current to the power circuit board.

Due to the limitation of available space within the facsimile machine, the power cables are inevitably arranged to extend near the transformer if the power cables are connected to the signal processing circuit board. Further, a relatively large current flows through the power cables, so that a relatively strong magnetic field is concentrically around the respective power cables. Thus, if the power supply through the power cables is switched on and off, the intensity of the magnetic field varies with time due to electromagnetic induction. As a result, the nearby transformer and/or the nearby circuit boards are likely to suffer noises.

One way to solve this problem is to enclose the transformer in a magnetic shield conductor and/or to interpose a magnetic shield conductor plate between the power cables and the nearby circuit board. However, such a solution is disadvantageous in that an additional insulation is required for avoiding electrical shorting between the magnetic shield conductor and the transformer (and/or the nearby circuit board), which may lead to a structural complication of the electronic apparatus and an increase in the required number of components while also increasing the assembly steps.

Another solution is to surround the outer insulation sheath of each power cable with a copper wire net which is grounded for magnetic shielding. The use of the grounding wire net will result in an added cost. Further, there is also additional steps of surrounding the power cable with the copper wire net and of grounding the wire net.

SUMMARY OF THE INVENTION

It is, therefore, an object of the present invention is to provide a power cable arrangement structure which is capable of reliably preventing a transformer from being adversely affected by the presence of the power cables.

According to one aspect of the present invention, there is provided a power cable arrangement structure in an electronic apparatus, the cable arrangement structure comprising: a first control board; a transformer mounted on the first control board; a second control board spaced from the first control board; a connector mounted on the second control board in facing relation to the transformer; and a plurality of power cables extending from the connector, the plurality of power cables including at least one power supply cable and at least one power return cable; wherein the plurality of power cables are bundled together at an intermediate portion.

With the power cable arrangement described above, since the current flow direction in the power supply cable is opposite to that in the power return cable, the magnetic fields generated around the respective power cables offset each other. Thus, it is possible to prevent the transformer from being adversely influenced by the magnetic fields of the power cables.

The plurality of power cables may be bundled together by a separate bundling device such as a belt, clamp or clip which is a relatively inexpensive element. Thus, the addition of the bundling device does not result in a higher cost than adopting other countermeasure for the same purposes.

Alternatively, the plurality of power cables may be bundled together by twisting themselves. Such an arrangement is advantageous in reducing the overall cost.

The power cable arrangement structure may further comprise a separation plate made of an electrically insulating material and provided between the first control board and the second control board, and the plurality of power cables may be made to extend along the separation plate at the intermediate portion. In this case, the plurality of power cables can be reliably prevented from unduly sagging toward the transformer. As a result, the adverse influences, on the transformer, of the magnetic fields of the power cables can be even more reduced.

In a preferred embodiment, the transformer is used for network control for a telephone line, whereas the second control board supports a printhead. Such an arrangement may typically apply to a facsimile machine.

The power cable arrangement structure may further comprise a power circuit board connected to the plurality of power cables via a second connector, and the power circuit board may be arranged in a plane which also contains the first control board.

According to another aspect of the present invention, there is provided a power cable arrangement structure in an electronic apparatus, the cable arrangement structure comprising: a first control board; a transformer mounted on the first control board; a second control board spaced from the first control board; a first connector mounted on the second control board in facing relation to the transformer; a second connector connected to a power supply circuit; and a plurality of power cables extending between the first connector and the second connector, the plurality of power cables including at least one power supply cable and at least one power return cable; wherein the plurality of power cables are bundled together at an intermediate portion by a separate bundling device.

According to a further aspect of the present invention, there is provided a power cable arrangement structure in an electronic apparatus, the cable arrangement structure comprising: a first control board; a transformer mounted on the first control board; a second control board spaced from the first control board; a first connector mounted on the second control board in facing relation to the transformer; a second connector connected to a power supply circuit; and a plurality of power cables extending between the first connector and the second connector, the plurality of power cables including at least one power supply cable and at least one power return cable; wherein the plurality of power cables are bundled together at an intermediate portion by twisting themselves.

Other objects, features and advantages of the present invention will be apparent from the detailed description of a preferred embodiment given below with reference to the accompanying drawings.

DETAILED DESCRIPTION OF THE PREFERRED EMBODIMENTS

The preferred embodiments of the present invention will be described below with reference to the accompanying drawings.

Figure 1:
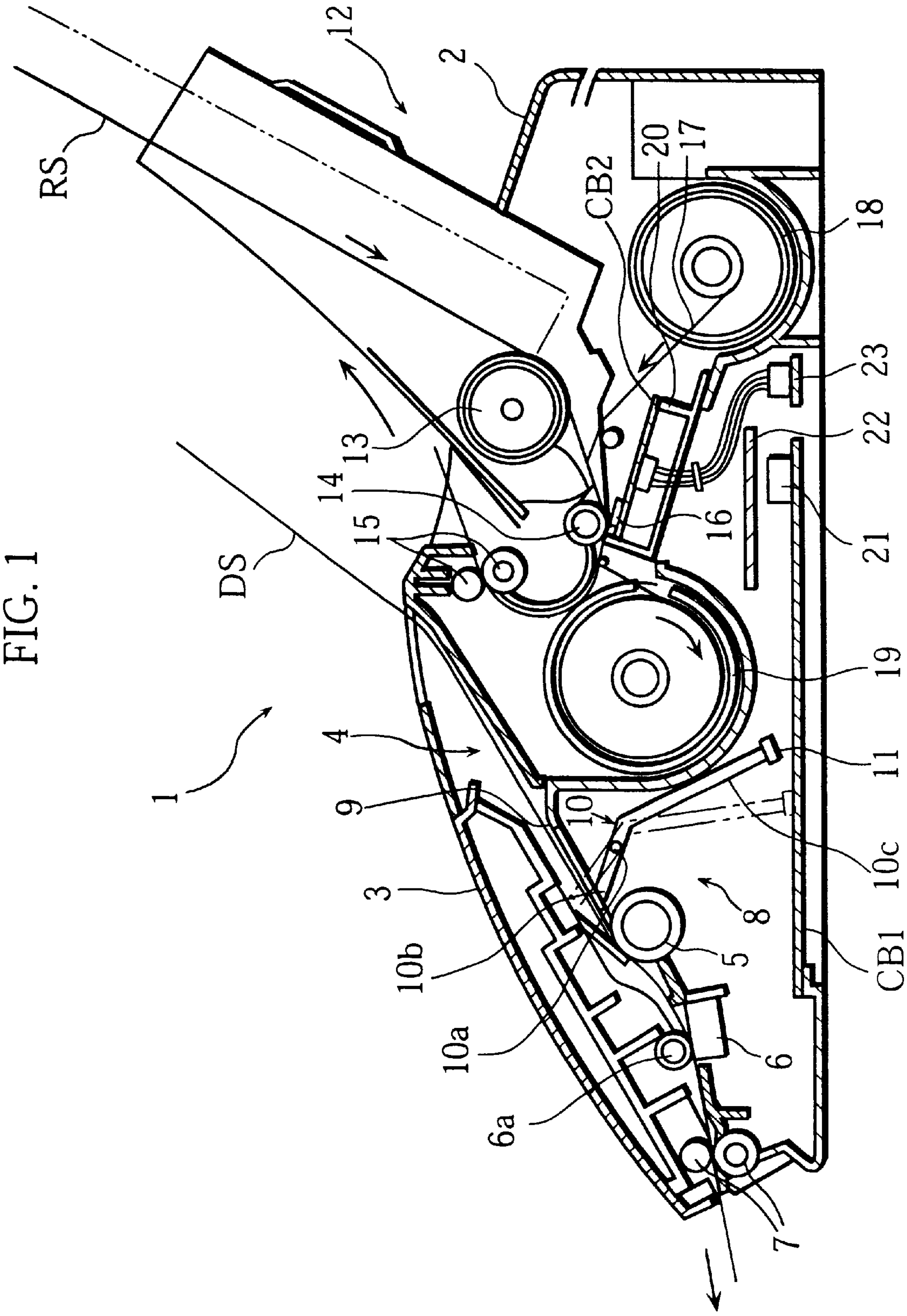
FIG. 1 is a sectional view showing a facsimile machine as an example of electronic device embodying the present invention.

FIG. 1 of the accompanying drawings represents an overall view of a facsimile machine as an example of electronic apparatus to which the present invention is applied. The facsimile machine generally represented by reference numeral 1 comprises a housing 2 which includes a front operation/display panel 3 provided with key switches (not shown) and liquid crystal display devices (not shown). Immediately under the front panel 3 is formed a document transfer path 4.

A document sheet DS is transferred along the document transfer path 4 by a feed roller 5, a platen roller 6*a* and a pair of discharge rollers 7. These rollers are driven by a drive motor (not shown) through a transmission gear mechanism (not shown). In the course of such transfer, the images (including characters, letters, numerals and etc.) carried on the document sheet DS is optically read by an image reader (e.g. a CCD image scanner) 6 arranged in facing relation to the platen roller 6*a*.

For detecting the presence of the document sheet DS in the document transfer path 4, a detecting device 8 is provided under a guide wall 9 which defines a part of the document transfer path 4. The detecting device 8 is arranged behind the feed roller 5. The guide wall 9 is provided with a slit 9*a*.

The detecting device 8 comprises an actuator 10 which includes a horizontal shaft 10*a* rotatably supported by the housing 2, a first or upper arm 10*b* extending upwardly from the shaft 10*a*, and a second or lower arm 10*c* extending downwardly from the shaft 10*a*. The actuator 10 may be integrally made of a synthetic resin.

If no document sheet is present at the inlet of the document transfer path 4, the first arm 10*b* of the actuator 10 projects into the document transfer path 4 through the slit 9*a* of the guide wall 9, as indicated by phantom lines in FIG. 1. On the other hand, when a document sheet DS is present at the inlet of the document transfer path 4, the first arm 10*b* comes into engagement with the document sheet DS and is thereby depressed into the slit 9*a*, as indicated by solid lines in FIG. 1. In this way, the actuator 10 pivots up and down about the horizontal shaft 10*a* in response to the presence and absence of a document sheet DS.

The second arm 10*c* of the actuator 10 has a lower end provided with a reflector 11. When the second arm 10*c* is pivoted down due to the absence of a document sheet DS, the reflector 11 comes close to and faces a sensor (not shown) which is mounted on a first control board CB1 which is, in turn, supported substantially horizontally at the bottom of the housing 2. The sensor is a reflection type sensor which has a light emitting portion and a light receiving portion.

When the actuator 10 assumes the paper-out position (the phantom line position in FIG. 1), the light emitted from the light emitting portion of the sensor is reflected on the reflector 11 for incidence into the light receiving portion of the sensor, so that the sensor 11 generates a paper-out signal. On the other hand, when the actuator 10 assumes the paper-in position (the solid line position in FIG. 1), the reflector 11 becomes far from the sensor to come completely out of the light reflecting position, so that the sensor generates a paper-in signal.

The housing 2 supports a recording paper receiver 12 for receiving a stack of recording paper sheets RS. Each of the recording paper sheets RS is transferred by a feed roller 13, a platen roller 14 and a pair of discharge rollers 15. These rollers are driven by a drive motor (not shown) through a transmission gear mechanism (not shown). In the course of such transfer, the recording paper sheet RS is subjected to printing by means of a printhead 16 held in facing relation to the platen roller 14 with an ink ribbon 17 held therebetween. The ink ribbon 17 is successively supplied from a roll receiver 18 to a winder 19.

The printhead 16 is mounted on a second control board CB2 which is, in turn, supported on a support member 20 fixed to the roll receiver 18. The second control board CB2 carries a signal processing circuit for processing print control signals to operate the printhead 16. According to the embodiment illustrated in FIG. 1, the second control board CB2 is obliquely oriented. However, the second control board CB2 may be arranged horizontally in parallel to the first control board CB1.

The first control board CB1 carries a transformer 21 at a position under the second control board CB2. The transformer 21 is used for operating a network control unit (NCU) provided on the first control board CB1.

The first control board CB1 and the second circuit board CB2 re isolated from each other by a separation plate 22 arranged between these control boards. The separation plate 22 may be typically made of a synthetic resin as an insulating material. In the embodiment illustrated in FIG. 1, the insulator plate 22 is arranged horizontally in parallel to the first control plate CB1. However, the insulator plate 22 may be arranged horizontally.

Electric power required for driving the printhead 16 is obtained from a power circuit board 23 which is arranged adjacent to the first control board CB1 and in the same horizontal plane as the first control board CB1. For this purpose, the second control board CB2 is connected to the power circuit board 23 through a plurality of power cables 24.

Figure 2:
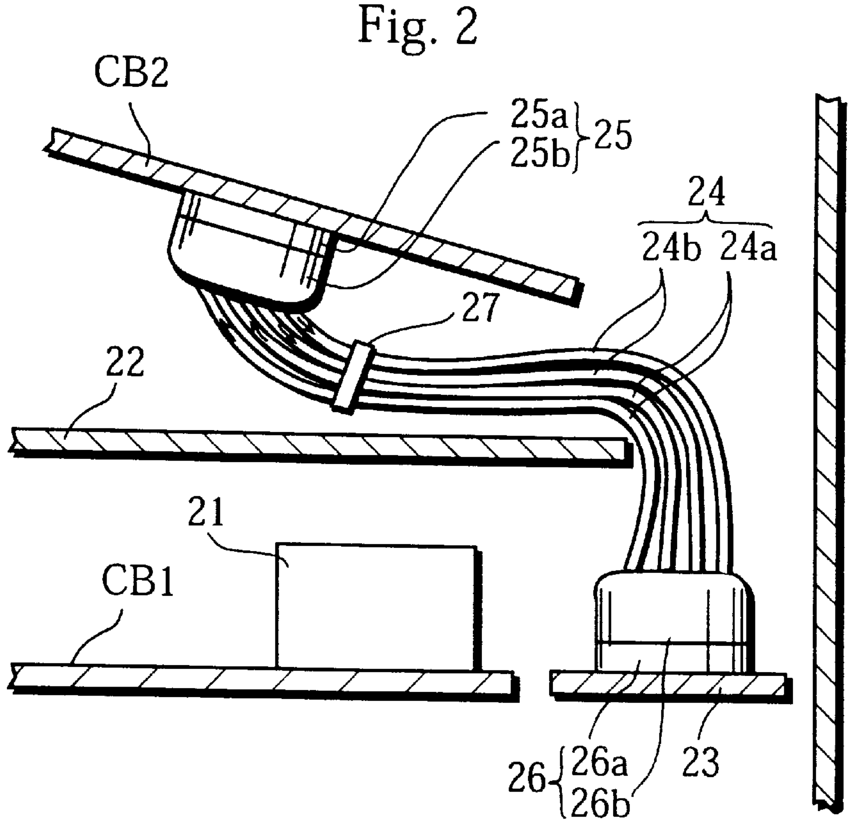
FIG. 2 is an enlarged fragmentary view, in vertical section, showing an example of cable arrangement in the same facsimile machine.

More specifically, as shown in FIG. 2, the power cables 24 include two power supply cables 24*a* for supplying power of e.g. 24V to the second control board CB2, and two power return cables 24*b* for allowing return of current from the second control board CB2. One end of each power cable 24 is connected to a first connector 25 attached to the second control board CB2, whereas the other end of each power cable 24 is connected to a second connector 26 attached to the power circuit board 23.

Each of the power cables 24 includes a conductor core wire made of e.g. copper, and an insulating sheath surrounding the core wire. The insulating sheath may have a single layer structure which includes only an outer coating made of a synthetic resin such as polyvinyl chloride (PVC) or polyethylene as an insulating material. Alternatively, each power cable 24 may have a double layer structure which includes an inner layer made of an insulating material such as cotton or paper, and an outer coating made of a synthetic resin such as polyvinyl chloride or polyethylene.

The first connector 25 is located above the transformer 21 substantially in facing relation thereto unless the separator plate 22 is provided. The first connector 25 includes a socket member 25*a* fixed on the second control board CB2, and a plug member 25*b* connected to the power cables 24 and removably inserted into the socket member 25*a*. Similarly, the second connector 26 includes a socket member 26*a* fixed on the power circuit board 23, and a plug member 26*b* connected to the power cables 24 and removably inserted into the socket member 26*a*.

According to the embodiment illustrated in FIGS. 1 and 2, the power supply cables 24*a* and the power return cables 24*b* are arranged to extend along each other. Further, the plurality of power cables 24 are bent to partially extend above the separation plate 22 substantially in parallel thereto and bundled together by a suitable bundling device 27 such as a belt, clamp or clip.

According to the above-described arrangement of the power cables 24, a current flows through the power supply cables 24*a* in a direction from the power circuit board 23 to the second control board CB2, whereas the current flow direction through the power return cables 24*b* is opposite. Thus, magnetic fields formed concentrically around the power supply cables 24*a* are opposite in direction to those formed around the power return cables 24*b*. Since the power supply cables 24*a* and the power return cables 24*a* are bundled together to be close to each other, the magnetic fields of the power supply cables 24*a* and those of the power return cables 24*b* offset each other, thereby reducing the adverse influences such as noises on the transformer 21. It should be also noted that the bundling device 27 such as a belt, clamp or clip is relatively inexpensive, so that the addition of this element does not add much to the overall cost.

Further, the separator plate 22 provided between the first control board CB1 and the second control board CB2 prevents the bundle of power cables 24 from unduly sagging toward the transformer 21. Thus, the separate plate 22 also contributes to reduce the adverse influences, on the transformer 21, of the magnetic fields generated around the power cables 24.

Figure 3:
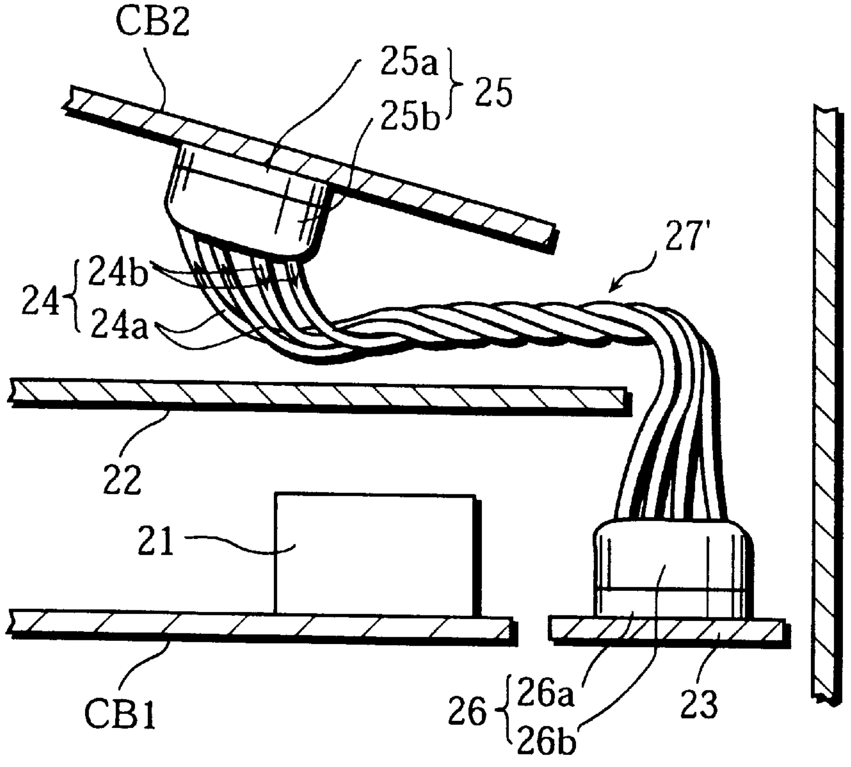
FIG. 3 is an enlarged fragmentary sectional view similar to FIG. 2 but showing another example of cable arrangement in the same facsimile machine.

FIG. 3 represents another embodiment of arranging the power cables 24. Specifically, the plurality of power cables 24 are made to partially extend above the separation plate 22 substantially in parallel thereto and bundled together by twisting at 27' like a strand. Obviously, since the power supply cables 24*a* and the power return cables 24*b* extend along and close each other, the cable arrangement shown in FIG. 3 enjoys the same advantages as that shown in FIGS. 1 and 2. Further, this embodiment is also advantageous in that the plurality of power cables 24 can be bundled without any additional parts, thereby realizing a cost reduction.

The preferred embodiments of the present invention being thus described, it is obvious that the same may be varied in many other ways. For instance, the power circuit board 23 may be omitted, in which case a power supply circuit may be provided on the first control board CB1 which is extended laterally to provide an excess area next to the transformer 21 for arranging the power circuit. Further, the power circuit board 23 may be arranged above or below the first control board CB1, provided that the first connector 25 is located above the transformer 21 substantially in facing relation thereto with the power cables 24 bundled together at an intermediate portion. Moreover, the transformer 21 may be used for other purposes (e.g. data communications and etc.) than network control. Such variations should not be regarded as a departure from the spirit and scope of the present invention, and all such modifications as would be obvious to those skilled in the art are intended to be included within the scope of the following claims.

We claim:

1. A power cable arrangement structure in an electronic apparatus, the cable arrangement structure comprising:

a first control board;

a transformer mounted on the first control board;

a second control board spaced from the first control board;

a connector mounted on the second control board in facing relation to the transformer; and a plurality of power cables extending from the connector, the plurality of power cables including at least one power supply cable and at least one power return cable;

wherein the plurality of power cables are bundled together at an intermediate portion.

2. The power cable arrangement structure according to claim 1, wherein the plurality of power cables are bundled together by a separate bundling device.

3. The power cable arrangement structure according to claim 1, wherein the plurality of power cables are bundled together by twisting themselves.

4. The power cable arrangement structure according to claim 1, further comprising a separation plate made of an electrically insulating material and provided between the first control board and the second control board.

5. The power cable arrangement structure according to claim 4, wherein the plurality of power cables extend along the separation plate at said intermediate portion.

6. The power cable arrangement structure according to claim 1, wherein the transformer is used for network control for a telephone line.

7. The power cable arrangement structure according to claim 1, wherein the second control board supports a print-head.

8. The power cable arrangement structure according to claim 1, further comprising a power circuit board connected to the plurality of power cables via a second connector.

9. The power cable arrangement structure according to claim 8, wherein the power circuit board is arranged in a plane which also contains the first control board.

10. A power cable arrangement structure in an electronic apparatus, the cable arrangement structure comprising:

a first control board;

a transformer mounted on the first control board;

a second control board spaced from the first control board;

a first connector mounted on the second control board in facing relation to the transformer;

a second connector connected to a power supply circuit; and a plurality of power cables extending between the first connector and the second connector, the plurality of power cables including at least one power supply cable and at least one power return cable;

wherein the plurality of power cables are bundled together at an intermediate portion by a separate bundling device.

11. The power cable arrangement structure according to claim 10, further comprising a separation plate made of an electrically insulating material and provided between the first control board and the second control board.

12. The power cable arrangement structure according to claim 11, wherein the plurality of power cables extend along the separation plate at said intermediate portion.

13. The power cable arrangement structure according to claim 10, wherein the power supply circuit is provided on a power circuit board separate from the first control board and the second control board.

14. The power cable arrangement structure according to claim 13, wherein the power circuit board is arranged in a plane which also contains the first control board.

15. A power cable arrangement structure in an electronic apparatus, the cable arrangement structure comprising:

a first control board;

a transformer mounted on the first control board;

a second control board spaced from the first control board;

a first connector mounted on the second control board in facing relation to the transformer;

a second connector connected to a power supply circuit; and a plurality of power cables extending between the first connector and the second connector, the plurality of power cables including at least one power supply cable and at least one power return cable;

wherein the plurality of power cables are bundled together at an intermediate portion by twisting themselves.

16. The power cable arrangement structure according to claim 15, further comprising a separation plate made of an electrically insulating material and provided between the first control board and the second control board.

17. The power cable arrangement structure according to claim 16, wherein the plurality of power cables extend along the separation plate at said intermediate portion.

18. The power cable arrangement structure according to claim 15, wherein the power supply circuit is provided on a power circuit board separate from the first control board and the second control board.

19. The power cable arrangement structure according to claim 18, wherein the power circuit board is arranged in a plane which also contains the first control board.

20. A power cable arrangement structure in an electronic apparatus, the cable arrangement structure comprising:

a first control board;

a transformer mounted on the first control board;

a second control board spaced from the first control board and in a facing relationship to the transformer;

a plurality of power cables extending from the second control board, the plurality of power cables including at least one power supply cable and at least one power return cable, wherein the plurality of power cables are bundled together at an intermediate portion.

21. The power cable arrangement structure according to claim 20, wherein the plurality of power cables are bundled together by a separate bundling device.

22. The power cable arrangement structure according to claim 20, wherein the plurality of power cables are bundled together by twisting.

23. The power cable arrangement structure according to claim 20, further comprising a separation plate made of an electrically insulating material and provided between the first control board and the second control board.

24. The power cable arrangement structure according to claim 23, wherein the plurality of power cables extend along the separation plate at said intermediate portion.

25. The power cable arrangement structure according to claim 20, wherein the transformer is used for network control for a telephone line.

26. The power cable arrangement structure according to claim 20, wherein the second control board supports a printhead.

27. The power cable arrangement structure according to claim 20, further comprising a power circuit board connected to the plurality of power cables.

28. The power cable arrangement structure according to claim 20, wherein the power circuit board is arranged in a plane which also contains the first control board.

29. A power cable assembly used in an electronic apparatus, comprising:

a first control board having a transformer mounted thereon;

a second control board opposing the transformer and offset therefrom;

a power circuit board adjacent the first control board and the transformer mounted thereon; and a plurality of power cables extending between the power circuit board and the second control board, the plurality of power cables including at least one power supply cable and at least one power return cable, wherein the plurality of cables are bundled at a center portion between the power circuit board and the second control board.

30. The power cable assembly according to claim 29, wherein the power circuit board is a part of the first control board.

31. The power cable assembly according to claim 29, wherein the plurality of power cables are bundled by twisting to form a twisted cable at the center portion.

32. The power cable assembly according to claim 29, further comprising a bundling device for holding the plurality of power cables together at the center portion.

33. The power cable assembly according to claim 29, further comprising a separator plate mounted in the electronic apparatus between the transformer on the first control board and the second control board, the bundled center portion of the plurality of power cables passing between the separator plate and the second control board.

* * * * *